(12) United States Patent
Takeuchi et al.

(10) Patent No.: US 9,284,192 B2
(45) Date of Patent: *Mar. 15, 2016

(54) METHOD FOR PRODUCING ELECTRODE MATERIAL FOR LITHIUM ION BATTERIES

(71) Applicant: SHOWA DENKO K.K., Minato-ku, Tokyo (JP)

(72) Inventors: Masataka Takeuchi, Tokyo (JP); Yuuichi Kamijou, Tokyo (JP); Yoshiyuki Nishimura, Tokyo (JP); Ryusuke Miura, Tokyo (JP); Takayuki Fukai, Tokyo (JP); Chiaki Sotowa, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/126,961

(22) PCT Filed: Oct. 19, 2012

(86) PCT No.: PCT/JP2012/077037
§ 371 (c)(1),
(2) Date: Dec. 17, 2013

(87) PCT Pub. No.: WO2013/058347
PCT Pub. Date: Apr. 25, 2013

(65) Prior Publication Data
US 2014/0205532 A1    Jul. 24, 2014

(30) Foreign Application Priority Data

Oct. 21, 2011 (JP) ................. 2011-232290

(51) Int. Cl.
*C01B 31/04* (2006.01)
*H01M 4/587* (2010.01)
*H01M 10/0525* (2010.01)

(52) U.S. Cl.
CPC ............... *C01B 31/04* (2013.01); *H01M 4/587* (2013.01); *H01M 10/0525* (2013.01); *Y02T 10/7011* (2013.01)

(58) Field of Classification Search
CPC ........................................... C01B 31/04
USPC ............................................ 423/448
See application file for complete search history.

(56) References Cited

U.S. PATENT DOCUMENTS 6,632,569 B1    10/2003    Kameda et al.
6,783,747 B1    8/2004    Sudo et al.
(Continued)

FOREIGN PATENT DOCUMENTS

EP    0 918 040 A1    5/1999
EP    2 418 172 A1    2/2012
(Continued)

OTHER PUBLICATIONS

Tamashausky, Albert V. "An Introduction to Synthetic Graphite." Prepared by the Technical Services Department of the Asbury Graphite Mills Inc. 2006.*
(Continued)

*Primary Examiner* — Brian Walck
(74) *Attorney, Agent, or Firm* — Sughrue Mion, PLLC

(57) ABSTRACT

A method for producing a graphie material for an electrode material for lithium ion batteries, including a step for exothermically graphitizing a carbon material by directly passing an electric current therethrough. The carbon material has an compact powder resistivity of 0.4 Ω·cm or less when compressed to a density of $1.4 \text{ g/cm}^3$, has an angle of repose in the range of 20° to 50° inclusive, and has a particle size (D90) in the volume-based particle size distribution measured using laser diffraction of 120 μm or less. The average surface interval (d002) of a surface (002) of the carbon material after graphitization, measured using x-ray diffraction, is in the range of 0.3354 nm-0.3450 nm inclusive.

12 Claims, 1 Drawing Sheet

(56) References Cited

U.S. PATENT DOCUMENTS

| | | |
|---|---|---|
| 2002/0160266 A1* | 10/2002 | Yamazaki et al. ......... 429/231.8 |
| 2009/0242849 A1 | 10/2009 | Sudoh et al. |
| 2012/0121988 A1 | 5/2012 | Lee et al. |

FOREIGN PATENT DOCUMENTS

| | | |
|---|---|---|
| JP | 4-190555 A | 7/1992 |
| JP | 7-252726 A | 10/1999 |
| JP | 11-335113 A | 12/1999 |
| JP | 2000-34111 A | 2/2000 |
| JP | 2002-100359 A | 4/2002 |
| JP | 3361510 B2 | 1/2003 |
| JP | 3534391 B2 | 6/2004 |
| JP | 3838618 B2 | 10/2006 |
| JP | 2007-172901 A | 7/2007 |
| JP | 4738553 B2 | 8/2011 |
| WO | 2011010789 A2 | 1/2011 |

OTHER PUBLICATIONS

International Search Report for PCT/JP2012/077037 dated Jan. 29, 2013.

* cited by examiner

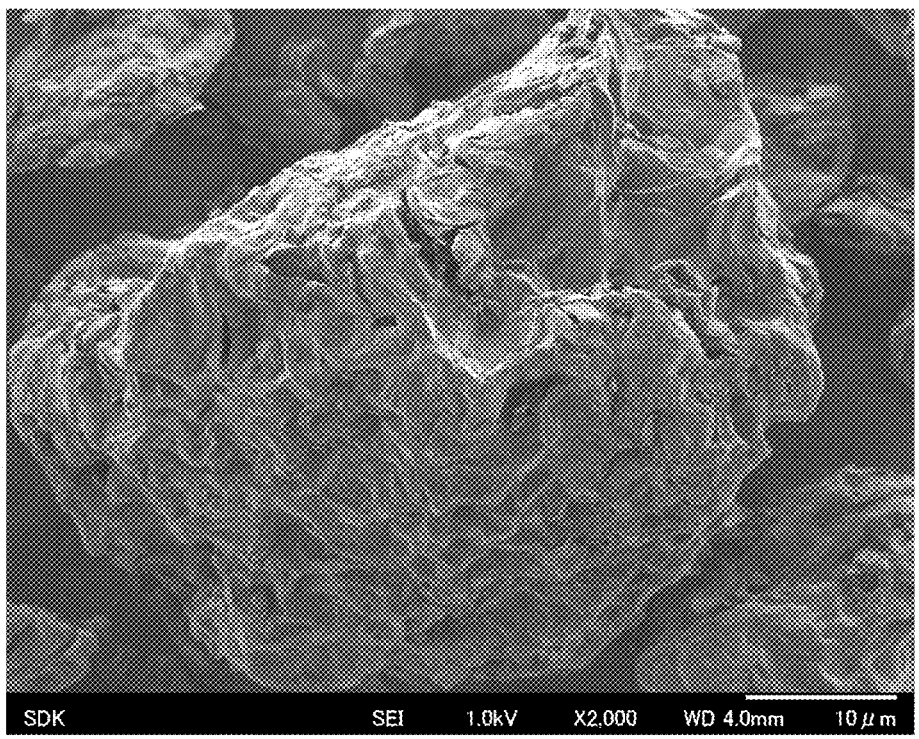

METHOD FOR PRODUCING ELECTRODE MATERIAL FOR LITHIUM ION BATTERIES

CROSS REFERENCE TO RELATED APPLICATIONS

This application is a National Stage of International Application No. PCT/JP2012/007037 filed Oct. 19, 2012, claiming priority based on Japanese Patent Application No. 2011-232290 filed Oct. 21, 2011, the contents of all of which are incorporated herein by reference in their entirety.

TECHNICAL FIELD

The present invention relates to a graphite material.

BACKGROUND ART

As a power source of a mobile device, a lithium ion secondary battery is mainly used for the reason of its high-energy density and long cycle life. The function of the mobile device or the like is diversified, resulting in increasing in power consumption thereof. Therefore, a lithium ion secondary battery is required to have an increased energy capacity and, simultaneously, to have an enhanced charge/discharge cycle characteristic. Further, there is an increasing demand recently for a secondary battery with a high output and a large capacity for electric tools such as an electric drill and a hybrid automobile. In this field, conventionally, a lead secondary battery, a nickel-cadmium secondary battery, and a nickel-hydrogen secondary battery are mainly used. A small and light lithium ion secondary battery with high energy density is highly expected, and there is a demand for a lithium ion secondary battery excellent in large current load characteristics.

In particular, in applications for automobiles, such as battery electric vehicles (BEV) and hybrid electric vehicles (HEV), a long-term cycle characteristic over 10 years and a large current load characteristic for driving a high-power motor are mainly required, and a high volume energy density is also required for extending a driving distance, which are severe as compared to mobile applications.

In the lithium ion secondary battery, generally, metal oxide such as lithium cobaltate and lithium manganese; and composite oxide thereof are used as a positive electrode active material, a lithium salt is used as an electrolyte, and a carbonaceous material such as graphite is used as a negative electrode active material.

Graphite used for a negative electrode active material is classified into natural graphite and artificial graphite.

Generally, natural graphite has advantages of low cost and high capacity due to its high crystallinity. However, as natural graphite has a scale shape, if natural graphite is formed into a paste together with a binder and applied to a collector, natural graphite is aligned in one direction. When an electrode made of such a material is charged, the electrode expands only in one direction, which degrades the performance of the electrode such as current characteristics and cycle life. Spherical natural graphite, which has been made by granulating natural graphite to be formed into a spherical shape, is proposed, however, the resulting spherical natural graphite is aligned because of being pulverized by pressing in the course of electrode production. Further, as a demerit of high crystallinity, the surface of the natural graphite is active, and hence a large amount of gas is generated during initial charging, which decreases an initial efficiency and further degrades a cycle life. In order to solve those problems, Japanese Patent publication No. 3534391 (U.S. Pat. No. 6,632,569, Patent Document 1), etc. propose a method involving coating artificial carbon on the surface of the natural graphite processed into a spherical shape. The material produced by this method can address a high-capacity, a low-current, and an intermediate-cycle characteristic required by the mobile applications, etc. However, it is very difficult for the material to satisfy the requests such as a large current and an ultralong-term cycle characteristic of a large battery as described above. In addition, natural graphite has a problem relating to quality stability because it contains a large amount of metallic impurities such as iron.

On the other hand, regarding artificial graphite, first, there is exemplified a mesocarbon microsphere-graphitized article described in JP 04-190555 A (Patent Document 2). This is a well-balanced negative electrode material, and is capable of producing a battery with a high capacity and a large current. However, it is difficult to achieve the cycle characteristics for a long period of time which are required for a large battery due to problems such that the conductive contact of the electrode powder with each other tends to degrade.

As the artificial graphite, articles obtained by graphitizing petroleum, coal pitch, coke, and the like are available at a relatively low cost. However, a satisfactory crystalline needle coke tends to align in a scale shape. In order to solve this problem, the method described in JP 3361510 B2 (EP 0918040 B; Patent Document 3), etc. yield results. This method can allow the use of not only fine powder of an artificial graphite raw material but also fine powder of natural graphite, or the like, and provides high capacity and excellent properties for a conventional graphite for a small lithium ion secondary battery. However, an improvement in productivity, a reduction in production cost, impurity management, improvements in cycle characteristics and storage characteristics, and the like toward an increase in use amount are indispensable to the satisfaction of characteristics required in automobile applications.

For example, the following methods have each been known as a method of graphitizing a carbon raw material powder as an ungraphitized product in a production process for an artificial graphite-based material to be used in the negative electrode of a lithium ion secondary battery:

(1) the carbon raw material powder is filled into a crucible made of graphite and graphitized with an Acheson furnace (JP 3838618 B2 (U.S. Pat. No. 6,783,747 A); Patent Document 4);

(2) the carbon raw material powder is molded into a certain shape with a binder such as a pitch or a polymer and graphitized with an Acheson furnace, and then a molding is shredded (Patent Document 3);

(3) the carbon raw material powder is loaded into a container made of a graphite material and heated with a heater as a heat source to be graphitized; and (4) the carbon raw material powder or a molding thereof is moved in a space heated with a heater.

CITATION LIST

Patent Document

[Patent Document 1] JP 3534391 B2 (U.S. Pat. No. 6,632,569 A)
[Patent Document 2] JP 04-190555 A
[Patent Document 3] JP 3361510 B2 (EP 0918040 B)
[Patent Document 4] JP 3838618 B2 (U.S. Pat. No. 6,783,747 A)

SUMMARY OF INVENTION

Technical Problem

Significant development of a large lithium ion secondary battery to be used in an automobile or the like has been expected. Accordingly, an improvement in productivity, a reduction in production cost, impurity management, quality management, improvements in cycle characteristics and storage characteristics, and the like involved in an increase in use amount are indispensable to a graphite material to be used in its negative electrode.

However, the conventional methods of graphitizing artificial graphite for a negative electrode for a lithium ion battery described in the items (1) to (4) involve the following problems:
(a) the depletion of a container such as the crucible formed of a graphite material and the inclusion of impurities from the crucible;
(b) contamination with a contaminant from the packing coke of the Acheson furnace;
(c) in the case of an Acheson system, productivity reduces because the product is subjected to a heat treatment together with a material except the product such as the packing coke;
(d) in the case of a molding, the inclusion of impurities at the time of its shredding after the graphitization and the deterioration of the surface of the powder;
(e) when a heater is used, a heater is depleted and it is difficult to achieve a high temperature of 3,000° C. or more; and
(f) when a heater is used, an increase in cost due to the use of an inert gas.

Therefore, an object of the present invention is to provide a method by which a high-quality graphite material for a negative electrode for a lithium ion secondary battery, the material having a small amount of impurities included therein and being excellent in stability, can be produced with good productivity and at a low cost.

Solution to Problem

The present invention relates to methods of producing an electrode material for a lithium ion battery according to the following items [1] to [14]:

[1] a method of producing an electrode material for a lithium ion battery, the method including a graphitizing step of directly passing an electric current through a carbon material to cause the material to generate heat, in which carbon material 1 before the graphitization has a compact powder resistivity of 0.4 Ω·cm or less when compressed to a density of 1.4 g/cm$^3$, has an angle of repose of 20° or more and 50° or less, and has a particle size D90 of 120 μm or less in a volume-based particle size distribution measured by a laser diffraction method, and carbon material 2 after the graphitization has an average interplanar spacing d002 of a (002) plane measured by an X-ray diffraction method of 0.3354 nm or more and 0.3450 nm or less;

[2] The method of producing an electrode material for a lithium ion battery according to 1 above, in which a ratio (compact powder resistivity when carbon material 2 after the graphitization is compressed to a density of 1.4 g/cm$^3$)/(compact powder resistivity when carbon material 1 before the graphitization is compressed to a density of 1.4 g/cm$^3$) is equal to or less than 0.5;

[3] The method of producing an electrode material for a lithium ion battery according to 1 or 2 above, in which carbon material 1 before the graphitization has an average particle size D50 of 30 μm or less in the volume-based particle size distribution measured by the laser diffraction method;

[4] The method of producing an electrode material for a lithium ion battery according to any one of 1 to 3 above, in which carbon material 1 before the graphitization has an angle of repose of 30° or more and 50° or less, and has a compressibility ((compacted bulk density-loose bulk density)×100/loose bulk density) calculated from a loose bulk density and a compacted bulk density of 20% or more and 50% or less;

[5] The method of producing an electrode material for a lithium ion battery according to any one of 1 to 4 above, in which carbon material 1 before the graphitization is obtained by subjecting an organic carbon raw material to a heat treatment at 800° C. or more and 1,500° C. or less;

[6] The method of producing an electrode material for a lithium ion battery according to 5 above, in which a pulverization for the organic carbon raw material is performed before the heat treatment;

[7] The method of producing an electrode material for a lithium ion battery according to 5 or 6 above, in which when the organic carbon raw material is heated under an inert atmosphere from 300° C. to 1,200° C., a heating loss thereof in the temperature region is 5 mass % or more and 20 mass % or less;

[8] The method of producing an electrode material for a lithium ion battery according to any one of 5 to 7 above, in which a sulfur content in the organic carbon raw material is 2 mass % or less;

[9] The method of producing an electrode material for a lithium ion battery according to any one of 5 to 8 above, in which the organic carbon raw material is one or more kinds selected from a petroleum pitch, a coal-tar pitch, a coke, a petroleum coke, and a mixture thereof;

[10] The method of producing an electrode material for a lithium ion battery according to any one of 1 to 9 above, in which carbon material 1 before the graphitization contains 10 to 100,000 ppm by mass of a boron-based compound and/or a silicon-based compound;

[11] The method of producing an electrode material for a lithium ion battery according to 1 above, in which a rectangular parallelepiped furnace body made of a ceramic brick and having an opening in an upper portion thereof is used in the graphitizing step;

[12] The method of producing an electrode material for a lithium ion battery according to 11 above, in which a length in a longitudinal direction of the furnace body viewed from an opening portion direction is twice or more as long as a length in a lateral direction thereof;

[13] The method of producing an electrode material for a lithium ion battery according to 11 or 12 above, in which electrodes for applying current are placed on inner sides of both end surfaces in the longitudinal direction of the furnace body; and

[14] The method of producing an electrode material for a lithium ion battery according to any one of 11 to 13 above, in which a surface in contact with air is provided with an oxygen barrier layer.

Advantageous Effects of Invention

According to the method of the present invention, a high-quality graphite material that can be used for an electrode material for a lithium ion battery, the material having a small amount of impurities included therein and being excellent in stability, can be produced with good productivity and at a low cost.

BRIEF DESCRIPTION OF DRAWINGS

FIG. 1 is an SEM photograph of a graphite material obtained in Example 1.

DESCRIPTION OF EMBODIMENTS

Hereinafter, the present invention is described in detail.
1. Method of Producing Graphite Material for Electrode Material for Lithium Ion Battery
(1) Physical Properties of Carbon Material 1 Before Graphitization and Production Method Therefor In the present invention, a graphite material is produced by graphitizing a carbon material 1 (carbon powder).

Although a raw material for the carbon material is not particularly limited, the following organic carbon raw material can be preferably used: when the organic carbon raw material is heated under an inert atmosphere from 300° C. to 1,200° C., its heating loss in the temperature region is 5 mass % or more and 20 mass % or less. When the heating loss becomes less than 5 mass %, a particle shape after the graphitization is liable to be a plate-like shape. In addition, the pulverized surface (edge portion) of the graphite material is liable to be exposed and its specific surface area enlarges. Accordingly, when the graphite material is used as a negative electrode, the number of its side reactions with an electrolytic solution increases. In contrast, when the heating loss exceeds 20 mass %, the proportion of binding between particles after the graphitization increases and the increase affects a yield. When the heating loss of the organic carbon raw material falls within the range, the surface of the graphite material to be obtained stabilizes, and when the material is used as the negative electrode, the number of its side reactions with the electrolytic solution reduces. This is probably because of the following reason: by virtue of a component that volatilizes through heating at 300 to 1,200° C., the crystal of the exposed edge portion graphitizes after carbonization to be reconstructed and stabilized, and a particle surface becomes smooth.

The heating loss can be measured with a commercial apparatus that can perform thermogravimetry/differential thermal analysis (TG-DTA) at a rate of temperature increase of 10° C./min. In examples, a TGDTAw6300 manufactured by Seiko Instruments Inc. is used, about 15 mg of a measurement sample are precisely weighed, placed on a pan made of platinum, and set in the apparatus, an argon gas is flowed at 200 ml/min, and the measurement is performed by increasing the temperature from 300° C. to 1,200° C. at 10° C./min. Used as a reference is α-alumina manufactured by Wako Pure Chemical Industries, Ltd. from which volatile matter has been removed in advance through a treatment at 1,500° C. for 3 hours.

The organic carbon raw material having such heating loss is preferably selected from, for example, a petroleum pitch, a coal-tar pitch, a coke, a petroleum coke, and a mixture thereof. Of those, the petroleum coke is more preferred and a raw coke out of the petroleum coke is preferred. The raw coke is liable to be spherical and to have a small specific surface area when pulverized because its crystal is undeveloped. In addition, the organic carbon raw material is preferably non-needle-shaped and a non-needle coke that has not been subjected to any heating treatment is particularly preferred.

The petroleum coke is a black, porous, solid residue obtained by the cracking or destructive distillation of petroleum or bituminous oil. The petroleum cokes are classified into a fluid coke and a delayed coke depending on coking methods. However, the fluid coke is powdery and finds use in limited applications, specifically, the fluid coke is used as a home fuel in an oil refinery. What is generally referred to as "petroleum coke" is the delayed coke. The delayed coke is classified into the raw coke and a calcined coke. The raw coke is a coke in its natural state recovered from a coking apparatus and the calcined coke is obtained by further calcining the raw coke again to remove its volatile matter. There is a high possibility that the raw coke causes dust explosion. Accordingly, in order that a fine particulate petroleum coke may be obtained, the raw coke has been pulverized after its volatile matter has been removed by calcination. In addition, the calcined coke has heretofore been used in an electrode or the like in general. The applications of the raw coke have been limited to, for example, a carbon material in the carbide industry, a foundry coke, and a coke for ferro-alloy making because its ash content is smaller than that of the coke.

The amount of sulfur in the organic carbon raw material is preferably as small as possible. Sulfur volatilizes at the time of the graphitizing step to exert such an adverse effect as to cause the bumping of the carbon material or to roughen its surface after the graphitization. The sulfur content in the organic carbon raw material is preferably 3 mass % or less, more preferably 2 mass % or less.

The amount of sulfur is measured as described below. Several tens of milligrams of the sample are weighed in a dedicated container and decomposed by high-frequency heating (with 1.5 g of W and 0.2 g of Sn as combustion improvers), and then the measurement is performed by using a carbon standard sample for steel and a carbon-sulfur simultaneous measuring apparatus (EMIA-920V manufactured by HORIBA, Ltd.).

The average coefficient of thermal expansion (CTE) of the organic carbon raw material at 30 to 100° C. is preferably $4.0 \times 10^{-6}/°$ C. or more and $6.0 \times 10^{-6}/°$ C. or less. The CTE of the carbon raw material can be measured by, for example, the following method. First, 500 g of the carbon raw material are pulverized with a vibration mill to 28 mesh or less. The sample is sieved, and 60 g of the sample of 28 to 60 mesh, 32 g of the sample of 60 to 200 mesh, and 8 g of the sample of 200 mesh or less are mixed so that the total amount may be 100 g. 100 grams of the blended sample are loaded into a stainless container, 25 g of a binder pitch are added to the sample, and the contents are heated and uniformly mixed in an oil bath at 125° C. for 20 minutes. The mixture is cooled and then pulverized with a vibration mill so that the total amount thereof may be 28 mesh or less. 30 grams of the sample are loaded into a pressure molding machine at 125° C. and then molded by being pressurized at a gauge pressure of 450 kg/cm$^2$ for 5 minutes. The molded article is loaded into a porcelain crucible, its temperature is increased from room temperature to 1,000° C. in an incinerator within 5 hours, the temperature is held at 1,000° C. for 1 hour, and the molded article is cooled. The calcined product is cut into a test piece measuring 4.3 by 4.3 by 20.0 mm with a precision cutter. The CTE is calculated by subjecting the test piece to thermodilatometry at 30 to 100° C. with an apparatus for thermomechanical analysis (TMA) such as a TMA/SS350 manufactured by Seiko Instruments Inc.

Carbon material 1 before the graphitization can be obtained by, for example, pulverizing the organic carbon raw material to a target particle size and then performing a treatment for reducing the resistance of the resultant powder to some extent.

Although a method of pulverizing the organic carbon raw material is not particularly limited, the pulverization is performed with, for example, a known jet mill, hammer mill, roller mill, pin mill, or vibration mill. The pulverization is preferably performed in a state where thermal hysteresis is as low as possible. The application of heat due to the pulverization volatilizes the component that volatilizes at 300° C. to 1,200° C., with the result that the following effect may not be obtained: the surface of the graphite material stabilizes, and when the material is used as a negative electrode, the number of its side reactions with an electrolytic solution reduces.

After the pulverization, the resistance of the powder is reduced. The resistance of carbon material 1 before the graphitization is desirably as low as possible because an electric current is directly passed through the carbon material at the time of the graphitization. Specifically, the compact powder resistivity of the carbon material when compressed to a density of 1.4 g/cm$^3$ is set to 0.4 Ω·cm or less. A method of reducing the resistance of the powder, which is not particularly limited, preferably involves performing a low-temperature heat treatment at 800° C. to 1,500° C. to increase its degree of carbonization. A preferred heat treatment temperature is 900 to 1,300° C., though the temperature varies depending on the kind of the organic carbon raw material to be used and conditions for the graphitization as a next step. The heat treatment temperature is desirably reduced to the extent possible from the viewpoint of productivity. However, when the temperature is excessively low, the resistance does not sufficiently reduce.

The low-temperature heat treatment increases the hardness of the carbon material as well. Accordingly, the pulverization is preferably performed in advance thereof from the viewpoints of the degree of freedom of a pulverization system and the productivity.

Carbon material 1 before the graphitization preferably has a particle size D90 in a volume-based particle size distribution measured by a laser diffraction method of 120 μm or less, a more preferred D90 is 80 μm or less, and a still more preferred D90 is 70 μm or less. When the D90 is excessively large, such problems as described below arise: the carbon material cannot cope with thinning of electrodes, a pressed electrode density is hard to increase, and a current load characteristic is low.

Classification is preferably performed so that a D50 (average particle size) may be 30 μm or less, and the classification is more preferably performed so that the D50 may be 4 μm or more and 25 μm or less. When the average particle size is large, such advantages as described below are obtained: the graphite material has improved stability with the electrolytic solution and is easy to apply. However, a high-current characteristic advances in a bad direction and the density of the electrode is hard to increase. In contrast, when the average particle size is small, a side reaction is liable to occur at the time of charge and discharge.

The particle size of the powder can be measured with a laser scattering/diffraction-type particle size distribution-measuring apparatus (CILAS).

Carbon material 1 before the graphitization has an aspect ratio (length of a major axis/length of a minor axis) of preferably 6 or less, more preferably 1 or more and 5 or less. When the aspect ratio is excessively large, it is liable to be difficult to control a current distribution at the time of the graphitization. In addition, such aspect ratio involves disadvantages in terms of applicability and stability when the graphite material is used as the negative electrode of a battery. The aspect ratio can be determined from an optical microscope image. The aspect ratio may be simply measured through image analysis with an FPIA3000 manufactured by Sysmex Corporation.

Carbon material 1 before the graphitization desirably has an angle of repose of 20° or more and 50° or less. When the angle of repose is less than 20°, the flowability of carbon material 1 rises. Accordingly, the carbon material may scatter during its filling into a furnace body or the powder may spout during its electrification. When the angle of repose exceeds 50°, the flowability of carbon material 1 reduces. Accordingly, its filling property in the furnace body may reduce to reduce the productivity or the electrification resistance of the entire furnace may extremely increase. A more preferred lower limit for the angle of repose is 30° and a more preferred upper limit therefor is 45°.

The angle of repose can be measured with a tap denser. Specifically, a KYT-4000 manufactured by SEISHIN ENTERPRISE Co., Ltd. is used, 50 g of a sample for measurement are caused to fall freely from a dedicated input port in the upper portion of the apparatus and are deposited in a triangular pyramid shape on a table included in the apparatus, and then a rising angle between the table and the triangular pyramid is measured with a protractor. The measured value can be defined as the angle of repose.

Carbon material 1 before the graphitization preferably has a compressibility ((compacted bulk density-loose bulk density)×100/loose bulk density) calculated from a loose bulk density (tapping zero times) and a compacted bulk density (tap density) of 20 to 50%. When the compressibility falls within the range, upon production of an electrode slurry in which the material is kneaded with a binder and a solvent, an electrode slurry that has good flowability and is easy to apply onto a collector can be obtained.

The loose bulk density is a density obtained by dropping 100 g of a sample from a height of 20 cm into a measuring cylinder, and then measuring the volume and mass of the sample without applying any vibration. The compacted bulk density (tap density) is a density obtained by measuring the volume and mass of 100 g of a powder tapped 400 times with an Autotap manufactured by Quantachrome Instruments.

Those measurement methods are based on ASTM B527 and JIS K5101-12-2, and the fall height of the Autotap in the tap density measurement is 5 mm.

(2) Graphitization

The graphitization is performed by directly passing an electric current through carbon material 1 to cause the material to generate heat.

The electric current can be directly passed through the carbon material with, for example, a rectangular parallelepiped furnace body made of a ceramic brick and having an opening in its upper portion. A length in the longitudinal direction of the furnace body viewed from an opening portion direction is set to about twice or more as long as a length in the lateral direction thereof, and electrodes for electrification are placed on the inner sides of both end surfaces in the longitudinal direction. The carbon material is loaded into the furnace and graphitized through heat generation caused by the electrification.

The adoption of such furnace body structure provides the following advantage: heat is uniformly applied to the carbon material and hence its agglomeration does not occur during the graphitization. In addition, a graphite material having a small amount of impurities is obtained because a temperature distribution is uniform and a trap portion for impurity volatilization is absent.

The graphitizing treatment is desirably performed under such an atmosphere that the carbon material hardly oxidizes. For example, a method involving performing a heat treatment in an inert gas atmosphere such as nitrogen and a method involving providing an oxygen barrier layer to a surface in contact with air. A method involving separately providing, for example, a carbon plate or a carbon powder layer as the barrier layer to cause the layer to consume oxygen is one such example.

The lower limit for the graphitizing treatment temperature is generally 2,000° C., preferably 2,500° C., more preferably 2,900° C., most preferably 3,000° C. Although the upper limit for the graphitizing treatment temperature is not particularly limited, the upper limit is preferably 3,200° C. because a high discharge capacity is obtained easily.

In the graphitization, a graphitization co-catalyst like a boron compound such as $B_4C$ or a silicon compound such as SiC can be added for improving the heat treatment efficiency of the graphitization and the productivity. Its blending amount is preferably 10 to 100,000 ppm by mass in the carbon material.

The graphitization is performed so that carbon material 2 after the graphitization may have an average interplanar spacing d002 of a (002) plane measured by an X-ray diffraction method in the range of 0.3354 nm or more and 0.3450 nm or less. The graphitization is preferably performed until the d002 becomes 0.3360 nm or more and 0.3370 nm or less. The d002 can be measured according to a known method by employing a powder X-ray diffraction (XRD) method (see Tokichi Noda, Michio Inagaki, Japan Society for the Promotion of Science, 117th committee document, 117-71-A-1 (1963), Michio Inagaki, et al., Japan Society for the Promotion of Science, 117th committee document, 117-121-C-5 (1972), and Michio Inagaki, "Carbon," 1963, No. 36, p. 25-34).

In addition, the graphitization is preferably performed so that a ratio "(compact powder resistivity when carbon material 2 after the graphitization is compressed to a density of 1.4 g/cm$^3$)/(compact powder resistivity when the carbon material 1 before the graphitization is compressed to a density of 1.4 g/cm$^3$)" may be equal to or less than 0.5. When the graphitization is performed as described in the foregoing, a uniform current distribution is obtained from the beginning of the initiation of the electrification and hence the graphitization can be performed with a uniform temperature distribution. The range can be adjusted by selecting the organic carbon raw material or carbon material 1, or by selecting the conditions for the graphitization.

2. Graphite Material for Electrode Material for Lithium Ion Battery

The graphite material (carbon material after the graphitization) obtained by graphitizing the carbon material preferably has an intensity ratio $I_D/I_G$ (R value) of a peak intensity ($I_D$) near 1360 cm$^{-1}$ to a peak intensity ($I_G$) near 1580 cm$^{-1}$ measured with a Raman spectroscopy spectrum of 0.01 or more and 0.2 or less. When the R value is more than 0.2, a large number of edge portions each having high activity are exposed in the surface of the graphite material and hence many side reactions are liable to occur at the time of charge and discharge. On the other hand, when the R value is less than 0.01, a barrier for the coming and going of lithium ion becomes higher, and the current load characteristic is liable to reduce. The laser Raman R value is measured with an NRS3100 manufactured by JASCO Corporation under the following conditions: excitation wavelength: 532 nm, entrance slit width: 200 μm, exposure time: 15 seconds, integration: twice, diffraction grating: 600 lines/mm.

The average coefficient of thermal expansion (CTE) of the graphite material at 30° C. to 100° C. is preferably $4.0 \times 10^{-6}$/° C. or more and $5.0 \times 10^{-6}$/° C. or less. The coefficient of thermal expansion has been utilized as one indicator representing the needle-shape crystallinity of coke. A material having a CTE of less than $4.0 \times 10^{6}$/° C. provides a large discharge capacity because of high crystallinity of graphite. However, the shape of a particle thereof is liable to be a plate-like shape. On the other hand, a material having a CTE of more than $5.0 \times 10^{-6}$/° C. has a small aspect ratio but the discharge capacity reduces because its graphite crystals are undeveloped. The CTE of the graphite material is measured in the same manner as in the CTE of the carbon raw material.

The graphite material has an average interplanar spacing d002 of a (002) plane measured by an X-ray diffraction method of preferably 0.3354 nm or more and 0.3450 nm or less, more preferably 0.3362 nm or more and 0.3370 nm or less. The d002 of the graphite material is measured by the same method as that in the foregoing.

The graphite material has an aspect ratio (length of a major axis/length of a minor axis) of preferably 6 or less, particularly preferably 1 or more and 5 or less. The aspect ratio can be determined from an optical microscope image. The aspect ratio may be simply measured through image analysis with an FPIA3000 manufactured by Sysmex Corporation.

The graphite material has a specific surface area (by BET method) of preferably 6 m$^2$/g or less, particularly preferably 1.0 m$^2$/g or more and 5.0 m$^2$/g or less. When the specific surface area exceeds 6 m$^2$/g, though it depends on the particle size, the surface activity of a particle thereof rises to result in a reduction in coulombic efficiency or cycle life, or the deterioration of its high-temperature storage stability due to, for example, the decomposition of an electrolytic solution.

The graphite material is obtained by directly electrifying the powder to graphitize the powder. Accordingly, the oxidation of the surface of the graphite material is suppressed as compared with a graphite material obtained by a conventional graphitization method but the graphite material is in a moderately oxidized state. Accordingly, the surface is stabilized and a side reaction with the electrolytic solution is suppressed.

With regard to the degree of the oxidation, an oxygen amount a (mass %) from the surface of a particle to 40 nm in its depth direction in the peak intensity of $O_{1s}$ obtained by HAX-PES measurement involving using a hard X-ray of 7,940 eV preferably satisfies a relationship of $0.010 \leq a \leq 0.04$ and more preferably satisfies a relationship of $0.010 \leq a \leq 0.03$. When the oxygen amount a is excessively large, a reduction in conductivity of the graphite crystal present in the graphite material becomes remarkable and a resistance component is enhanced. As a result, a charge-discharge reaction is inhibited, which leads to a reduction in capacity or a reduction in large-current characteristics in some cases.

The graphite material preferably has a loose bulk density (tapping zero times) of 0.7 g/cm$^3$ or more, and a compacted bulk density (tap density) upon performance of tapping 400 times of 1.0 g/cm$^3$ or more and 1.35 g/cm$^3$ or less. When the loose bulk density is 0.7 g/cm$^3$ or more, the density of an electrode before pressing upon application of the material to the electrode can be additionally increased. From the value, whether or not a sufficient electrode density can be obtained by one roll pressing can be predicted. In addition, when the compacted bulk density (tap density) falls within the range, the electrode density to be achieved at the time of the pressing can be made sufficiently high.

Those densities are each measured by the same method as that in the foregoing.

The graphite material preferably has an average particle size (D50) of 4 μm or more and 25 μm or less in a volume-based particle size distribution measured by a laser diffraction method.

The iron content of the graphite material is preferably 0 to 30 ppm by mass. When the iron content falls within the range, a minute short circuit in the case where the material is used in a battery can be prevented, and hence an improvement in safety and an improvement in battery product yield can be achieved. With increase in the iron content, there is a higher possibility that a minute short circuit occurs in the case where the material is used in a battery, and hence a reduction in safety or a reduction in battery product yield occurs in some cases.

The iron content (remaining iron amount) is measured as described below. 50 to 100 mg of the sample are weighed and then decomposed by being heated through the addition of sulfuric acid. After the resultant has been left standing to cool, nitric acid is added to the resultant to perform thermolysis. The foregoing operation is repeated until the solution becomes transparent. 50 mg of the resultant liquid are taken out and then diluted tenfold. After that, the content is measured by performing ICP mass spectrometry.

3. Slurry for Electrodes for Lithium Ion Battery

The slurry contains the carbon material and a binder. The slurry can be obtained by kneading the carbon material with a binder. A known device such as a ribbon mixer, a screw-type kneader, a Spartan Granulator, a Loedige Mixer, a planetary mixer, or a universal mixer may be used for kneading.

Examples of the binder include known binders such as: fluorine-based polymers such as polyvinylidene fluoride and polytetrafluoroethylene; and rubber-based binders such as styrene-butadiene rubber (SBR).

The preferable use amount of the binder is 0.5 to 20 parts by mass in terms of 100 parts by mass of the carbon material, and the use amount is more preferably about 1 to 20 parts by mass.

The slurry may contain conductive carbon such as carbon black including acetylene black and Ketjanblack, carbon nanofiber including vapor-grown carbon fiber, carbon nanotube and graphite fine powder as a conductive additive.

The blending amount of the above conductive additive is particularly not limited and the preferable amount is 0.5 to 30 parts by mass in terms of 100 parts by mass of the carbon material.

A solvent can be used at a time of kneading. Examples of the solvent include known solvents suitable for the respective binders such as: toluene and N-methylpyrolidone in the case of a fluorine-based polymer; water in the case of SBR; dimethylformamide; and isopropanol. In the case of the binder using water as a solvent, it is preferred to use a thickener together. The amount of the solvent is adjusted so as to obtain a viscosity at which a paste can be applied to a collector easily.

4. Electrode for Lithium Ion Battery

An electrode for a lithium ion battery is formed of a molding of the above-mentioned slurry for an electrode. The electrode is obtained, for example, by applying the above mentioned slurry to a collector, followed by drying and pressure molding.

Examples of the collector include foils and mesh of aluminum, nickel, copper, stainless steel and the like. The coating thickness of the slurry is generally 20 to 150 μm. When the coating thickness becomes too large, a negative electrode may not be placed in a standardized battery container. There is no particular limitation to the slurry coating method, and an example of the coating method includes a method involving coating with a doctor blade or a bar coater, followed by molding with roll pressing or the like.

Examples of the pressure molding include roll pressure molding, compression molding, and the like. The pressure for the pressure molding is preferably about 1 to 3 t/cm$^2$. As the electrode density of the electrode increases, the battery capacity per volume generally increases. However, if the electrode density is increased too much, the cycle characteristic tends to be degraded generally. If the slurry is used, the degradation in the cycle characteristic is small even when the electrode density is increased. Therefore, an electrode having the high electrode density can be obtained. The electrode density of the electrode obtained using the above mentioned slurry is 1.2 to 1.9 g/cm$^3$.

5. Lithium Ion Secondary Battery

The lithium ion secondary battery has a structure in which a positive electrode and a negative electrode are soaked in an electrolytic solution or an electrolyte. The above electrode is used as a negative electrode for the lithium ion secondary battery.

In the positive electrode of the lithium ion secondary battery, a transition metal oxide containing lithium is generally used as a positive electrode active material, and preferably, an oxide mainly containing lithium and at least one kind of transition metal element selected from the group consisting of Ti, V, Cr, Mn, Fe, Co, Ni, Mo, and W, which is a compound having a molar ratio of lithium to a transition metal element of 0.3 to 2.2, is used. More preferably, an oxide mainly containing lithium and at least one kind of transition metal element selected from the group consisting of V, Cr, Mn, Fe, Co, and Ni, which is a compound having a molar ratio of lithium to a transition metal of 0.3 to 2.2, is used. It should be noted that Al, Ga, In, Ge, Sn, Pb, Sb, Bi, Si, P, B, and the like may be contained in a range of less than 30% by mole with respect to the mainly present transition metal. Of the above-mentioned positive electrode active materials, it is preferred that at least one kind of material having a spinel structure represented by a general formula $Li_xMO_2$ (M represents at least one kind of Co, Ni, Fe, and Mn, and $0<x\leq1.2$), or $Li_yN_2O_4$ (N contains at least Mn, and $0<y\leq2$) be used.

Further, as the positive electrode active material, there may be particularly preferably used at least one kind of materials each including $Li_yM_aD_{1-a}O_2$ (M represents at least one kind of Co, Ni, Fe, and Mn, D represents at least one kind of Co, Ni, Fe, Mn, Al, Zn, Cu, Mo, Ag, W, Ga, In, Sn, Pb, Sb, Sr, B, and P with the proviso that the element corresponding to M being excluded, y=0 to 1.2, and a=0.5 to 1) and materials each having a spinel structure represented by $Li_z(N_bE_{1-b})_2O_4$ (N represents Mn, E represents at least one kind of Co, Ni, Fe, Mn, Al, Zn, Cu, Mo, Ag, W, Ga, In, Sn, Pb, Sb, Sr, B and P, b=1 to 0.2, and z=0 to 2).

Specifically, there are exemplified $Li_xCoO_2$, $Li_xNiO_2$, $Li_xMnO_2$, $Li_xCo_aNi_{1-a}O_2$, $Li_xCo_bV_{1-b}Oz$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, and $Li_xMn_cFe_{2-c}O_4$ (where, x=0.02 to 1.2, a=0.1 to 0.9, b=0.8 to 0.98, c=1.6 to 1.96, and z=2.01 to 2.3). As the most preferred transition metal oxide containing lithium, there are given $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$, (x=0.02 to 1.2, a=0.1 to 0.9, b=0.9 to 0.98, and z=2.01 to 2.3). It should be noted that the value of x is a value before starting charge and discharge, and the value increases and decreases in accordance with charge and discharge.

Although the average particle size of the positive electrode active material is not particularly limited, the size is preferably 0.1 to 50 μm. It is preferred that the volume of the particles of 0.5 to 30 μm be 95% or more. It is more preferred that the volume occupied by the particle group with a particle diameter of 3 μm or less be 18% or less of the total volume, and the volume occupied by the particle group of 15 µm or more and 25 µm or less be 18% or less of the total volume.

Although the specific area is not particularly limited, the area is preferably 0.01 to 50 m²/g, particularly preferably 0.2 m²/g to 1 m²/g by a BET method. Further, it is preferred that the pH of a supernatant obtained when 5 g of the positive electrode active material is dissolved in 100 ml of distilled water be 7 or more and 12 or less.

In a lithium ion secondary battery, a separator may be provided between a positive electrode and a negative electrode. Examples of the separator include non-woven fabric, cloth, and a microporous film each mainly containing polyolefin such as polyethylene and polypropylene, a combination thereof, and the like.

As an electrolytic solution and an electrolyte forming the lithium ion secondary battery, a known organic electrolytic solution, inorganic solid electrolyte, and polymer solid electrolyte may be used, but an organic electrolytic solution is preferred in terms of electric conductivity.

As a solvent of the organic electrolytic solution, preferred is a solvent such as: an ether such as diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether, or ethylene glycol phenyl ether; an amide such as formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide, or hexamethylphosphorylamide; a sulfur-containing compound such as dimethylsulfoxide or sulfolane; a dialkyl ketone such as methyl ethyl ketone or methyl isobutyl ketone; a cyclic ether such as ethylene oxide, propylene oxide, tetrahydrofuran, 2-methoxytetrahydrofuran, 1,2-dimethoxyethane, or 1,3-dioxolan; a carbonate such as ethylene carbonate or propylene carbonate; γ-butyrolactone; N-methylpyrrolidone; acetonitrile; nitromethane; or the like. Further, there are preferably exemplified: esters such as ethylene carbonate, butylene carbonate, diethyl carbonate, dimethyl carbonate, propylene carbonate, vinylene carbonate, and γ-butyrolactone; ethers such as dioxolan, diethyl ether, and diethoxyethane; dimethylsulfoxide; acetonitrile; tetrahydrofuran; and the like. A carbonate-based nonaqueous solvent such as ethylene carbonate or propylene carbonate may be particularly preferably used. One kind of those solvents may be used alone, or two or more kinds thereof may be used as a mixture.

A lithium salt is used for a solute (electrolyte) of each of those solvents. Examples of a generally known lithium salt include $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $LiN(CF_3SO_2)_2$, and the like.

Examples of the polymer solid electrolyte include a polyethylene oxide derivative and a polymer containing the derivative, a polypropylene oxide derivative and a polymer containing the derivative, a phosphoric acid ester polymer, a polycarbonate derivative and a polymer containing the derivative, and the like.

It should be noted that there is no constraint for the selection of members required for the battery configuration other than the aforementioned members.

EXAMPLES

Hereinafter, the present invention is described in more detail by way of typical examples. It should be noted that these are simple exemplification for explanation and the present invention is not limited by them.

(d002) etc. in Examples and Comparative Examples are measured by a method described in "Best mode for carrying out the invention". Further, the methods for measuring other physical properties are given below.

(1) Heating Loss in Range of 300° C. to 1,200° C.

A thermogravimetry/differential thermal analyzer (TGD-TAw6300 manufactured by Seiko Instruments Inc.) was used, about 15 mg of a measurement sample were precisely weighed, placed on a pan made of platinum, and set in the apparatus, an argon gas was flowed at 200 ml/min, and a change in mass of the sample in the range of 300° C. to 1,200° C. was measured by increasing its temperature at a rate of temperature increase of 10° C./min. Used as a reference was α-alumina manufactured by Wako Pure Chemical Industries, Ltd. from which volatile matter had been removed in advance through a treatment at 1,500° C. for 3 hours.

(2) Average Coefficient of Thermal Expansion (CTE)

500 g of a sample were pulverized with a vibration mill to 28 mesh or less. The sample was sieved, and 60 g of the sample of 28 to 60 mesh, 32 g of the sample of 60 to 200 mesh, and 8 g of the sample of 200 mesh or less were mixed so that the total amount became 100 g. 100 g of the blended sample were loaded into a stainless container, 25 g of a binder pitch were added to the sample, and the contents were heated and uniformly mixed in an oil bath at 125° C. for 20 minutes. The mixture was cooled and then pulverized with a vibration mill so that the total amount thereof became 28 mesh or less. 30 g of the sample were loaded into a pressure molding machine at 125° C. and then molded by being pressurized at a gauge pressure of 450 kg/cm² for 5 minutes. The molded article was loaded into a porcelain crucible, its temperature was increased from room temperature to 1,000° C. in a calcination furnace within 5 hours, the temperature was held at 1,000° C. for 1 hour, and the molded article was cooled. The calcined product was cut into a test piece measuring 4.3 by 4.3 by 20.0 mm with a precision cutter. A CTE was calculated by subjecting the test piece to thermodilatometry at 30 to 100° C. with an apparatus for thermomechanical analysis (TMA). A TMA/SS350 manufactured by Seiko Instruments Inc. was used as the TMA.

(3) Particle Size (D50 and D90)

A volume-based average particle size (D50) and a volume-based particle size (D90) were determined by using a CILAS as a laser scattering/diffraction-type particle size distribution-measuring apparatus.

(4) Compact Powder Resistivity 10 g of a sample were loaded into a container made of resin having current-voltage terminals placed on its side surfaces, an electric current of 100 mA was passed through the sample while the sample was compressed by applying a load downward in a vertical direction, and then the resistivity of the electric current passing the sample was measured. The resistivity read at the time point when the density of the sample became 1.4 g/cm³ was defined as a compact powder resistivity.

(5) Compressibility and Compacted Bulk Density (Tap Density)

A compressibility is calculated from an equation "(compacted bulk density-loose bulk density)×100/loose bulk density (%)," a loose bulk density is a density obtained by causing 100 g of a sample to fall from a height of 20 cm into a measuring cylinder, and then measuring the volume and mass of the sample without applying any vibration, and a compacted bulk density (tap density) is a density obtained by measuring the volume and mass of 100 g of a powder tapped with an Autotap manufactured by Quantachrome Instruments 400 times.

Those measurement methods are based on ASTM B527 and JIS K5101-12-2, and the fall height of the Autotap in the tap density measurement is 5 mm.

(6) Sulfur Amount

Several tens of milligrams of a sample were precisely weighed in a dedicated container and decomposed by high-frequency heating (with 1.5 g of W and 0.2 g of Sn as combustion improvers), and then the measurement was performed by using a carbon standard sample for steel and a carbon-sulfur simultaneous measuring apparatus (EMIA-920V manufactured by HORIBA, Ltd.).

(7) Angle of Repose

A tap denser (KYT-4000 manufactured by SEISHIN ENTERPRISE Co., Ltd.) was used, 50 g of a sample for measurement were caused to fall freely from a dedicated input port in the upper portion of the apparatus and were deposited in a triangular pyramid shape on a table accompanying in the apparatus, and then a rising angle between the table and the triangular pyramid was measured with a protractor. The measured value was defined as an angle of repose.

(8) Specific Surface Area

Using a specific area measurement apparatus NOVA-1200 (manufactured by Yuasa Ionics Inc.), a specific surface area was measured by a BET method that is a general measurement method of a specific surface area.

(9) Aspect Ratio

The aspect ratio of a particle was measured through image analysis with an FPIA3000 manufactured by Sysmex Corporation. The measurement was performed at 3,000 or more points, preferably 30,000 or more points, more preferably 50,000 or more points, and a calculated average was used.

(10) Raman R value

A Raman spectroscopy spectrum was measured with NRS3100 manufactured by JASCO Corporation under the following conditions: excitation wavelength: 532 nm, entrance slit width: 200 µm, exposure time: 15 seconds, integration: twice, diffraction grating: 600 lines/mm. An intensity ratio $I_D/I_G$ of a peak intensity ($I_D$) near 1360 cm$^{-1}$ to a peak intensity ($I_G$) near 1580 cm$^{-1}$ was defined as an R value.

(11) Remaining Oxygen Amount

The oxygen amount of the surface of a graphite material is determined by performing HAX-PES measurement at an incident energy of 7,940 eV with an apparatus permanently installed in the SPring-8 (Beam-line BL46XU).

Measurement conditions are as described below. The narrow spectrum of $C_{1s}$ is measured in the energy range of the kinetic energy of a photoelectron of 7,638 to 7,658 eV. The narrow spectrum of $O_{1s}$ is measured in the energy range of the kinetic energy of a photoelectron of 7,396 to 7,416 eV.

The oxygen amount of the surface of the graphite material is determined according to the following method.

Energy Calibration of Photoelectron Spectrum

A plate-like Au sample as a standard sample is subjected to the measurement. The narrow spectrum of $Au_{4f}$ is measured in the energy range of a kinetic energy of 7,648 to 7,859 eV. A work function $\phi$ value of the apparatus permanently installed in the BL46XU is calculated by calculating a difference between the peak position of $Au_{4f7/2}$ obtained by the measurement and the theoretical peak position of $Au_{4f7/2}$. The energy calibration of the narrow spectrum of the graphite material is performed on the basis of the calculated $\phi$ value.

Normalization of Photoelectron Spectrum Intensity

The $O_{1s}$ narrow spectrum intensity of the graphite material is normalized on the basis of an arbitrary $C_{1s}$ narrow spectrum intensity and the $C_{1s}$ narrow spectrum intensity obtained by the measurement. A normalized intensity $x(O_{1s})$ is calculated from the following equation 1.

Normalized intensity $x(O_{1s})$=measured intensity ($O_{1s}$)×arbitrary intensity ($C_{1s}$)/measured intensity ($C_{1s}$) [Equation 1]

Determination of Oxygen Amount of Surface of Graphite Material

The surface oxygen amount of the graphite material of each of the examples and the comparative examples is determined on the basis of the foregoing from the normalized intensity $x(O_{1s})$ of the graphite material according to the following equation 2. Here, the arbitrary intensity ($C_{1s}$) in the equation 2 is the value used in the equation 1.

Graphite material surface oxidation amount a (mol %)=(normalized intensity $x(O_{1s})$/arbitrary intensity $c$ ($C_{1s}$))×measured number of integrations $d$ ($C_{1s}$)/measured number of integrations $e$ ($O_{1s}$) [Equation 2]

In the measurement, information about a range from the surface of the graphite material to a depth of about 40 nm is integrated by using radiation having extremely high brightness. Accordingly, a high-accuracy measured result substantially unaffected by the contamination of the surface of the graphite material is obtained.

The calculation of the oxygen amount by the method involving the normalization based on the $C_{1s}$ narrow spectrum intensity of carbon is valid because the ratio of carbon as a main component to the graphite material is overwhelmingly high.

(12) Remaining Iron Amount 50 to 100 mg of a sample were weighed and then decomposed by being heated through the addition of sulfuric acid. After the resultant had been left standing to cool, nitric acid was added to the resultant to perform thermolysis. The operation was repeated until the solution became transparent. 50 mL of the liquid obtained by the operation were taken out and then diluted tenfold. After that, a remaining iron amount was measured by ICP mass spectrometry.

(13) Battery Evaluation Method a) Production of Slurry:

To 1 part by mass of a graphite material, 0.1 part by mass of KF polymer L1320 produced by Kureha Corporation (N-methylpyrrolidone (NMP) solution containing 12% by mass of polyvinylidene fluoride (PVDF)) is added, and the mixture is kneaded by a planetary mixer to obtain a main undiluted solution.

b) Production of an Electrode:

NMP was added to the main undiluted solution and the viscosity thereof was adjusted. After that, the resultant solution was applied to a high-purity copper foil to a thickness of 250 µm using a doctor blade. The high-purity copper foil thus obtained was dried in vacuum at 120° C. for 1 hour and punched into a size of 18 mmΦ. The electrode thus punched out was sandwiched between pressing plates made of super-steel and pressed so that a press pressure becomes about $1\times10^2$ to $3\times10^2$ N/mm$^2$ ($1\times10^3$ to $3\times10^3$ kg/cm$^2$) with respect to the electrode. Then, the electrode was dried in a vacuum drier at 120° C. for 12 hours to obtain an electrode for evaluation.

c) Production of a Battery:

A triode cell was produced as follows. The following operation was performed in a dry argon atmosphere at a dew point of −80° C. or less.

In a cell (inner diameter: about 18 mm) with a screwed-type lid made of polypropylene, the carbon electrode with a copper foil produced in the above-mentioned item (2) and a metal lithium foil were sandwiched and stacked between separators (microporous films made of polypropylene (Cell Guard 2400)). Further, metal lithium for reference was stacked in the same way. An electrolytic solution is added to the resultant to obtain a cell for testing.

d) Electrolytic Solution:

In a mixed solution of 8 parts by mass of ethylene carbonate (EC) and 12 parts by mass of diethyl carbonate (DEC), 1 mol/liter of $LiPF_6$ was dissolved as an electrolyte.

e) Discharge Capacity and Initial Efficiency:

A constant-current and constant-voltage charge and discharge test was performed at a current density of 1.0 mA/cm$^2$ (corresponding to 0.5C).

Regarding charging (insertion of lithium into carbon), constant current (CC) charging was performed at 1.0 mA/cm$^2$ from a rest potential to 0.002 V. Next, the charging was switched to constant voltage (CV) charging at 0.002 V and stopped when a current value dropped to 25.4 µA.

Regarding discharging (discharge from carbon), CC discharging was performed at a current density at 1.0 mA/cm$^2$ (corresponding to 0.5C) and cut off at a voltage of 1.5 V.

Example 1

A petroleum-based raw coke (non-needle coke) whose heating loss measured by thermogravimetry (TG) in the range of 300° C. to 1,200° C. was 12.5 mass % was pulverized with a Bantam Mill manufactured by Hosokawa Micron Corporation. The pulverized product was subjected to air classification with a Turbo Classifier manufactured by NISSHIN ENGINEERING INC. to provide an organic carbon raw material having a D50 of 16.0 µm. Next, the pulverized organic carbon raw material was treated at 1,000° C. with a Roller Hearth Kiln manufactured by NGK INSULATORS, LTD. while a nitrogen gas was flowed, whereby carbon material 1 was obtained. Carbon material 1 had a compact powder resistivity of 0.30 Ω·cm when compressed to a density of 1.4 g/cm$^3$, and had an angle of repose of 36°.

A furnace having a vertical length of 500 mm, a horizontal length of 1,000 mm, and a depth of 200 mm was made of ceramic bricks, and then electrode plates each measuring 450 mm long by 180 mm wide by 20 mm thick were placed on both end surfaces inside the furnace. Carbon material 1 was packed in the furnace, and then the furnace was closed with a lid provided with a nitrogen gas input port and an exhaust port. A transformer was placed, and then carbon material 1 was heated by passing an electric current between the electrode plates for about 5 hours while flowing a nitrogen gas, whereby carbon material 1 was graphitized. Its maximum temperature was 3,200° C.

Table 1 summarizes the various physical properties and battery evaluation results of the resultant graphite material (carbon material 2) together with the physical properties of the organic carbon raw material and carbon material 1. In addition, FIG. 1 shows an SEM photograph.

It is understood from the d002 and the discharge capacity that graphite crystallization advanced over a wide range in the furnace. That is, it was confirmed that in the graphitization method, the entire powder was thermally treated to 3,000° C. or more within a short time period to be graphitized in an efficient manner at least comparable to a conventional method involving using a graphite crucible container in which packing coke that did not serve as a product was present in the furnace. In addition, a battery satisfactory in terms of both discharge capacity and initial efficiency was able to be obtained.

Example 2

The same petroleum-based raw coke (non-needle coke) as that of Example 1 and a petroleum-based raw needle coke whose heating loss measured by TG in the range of 300° C. to 1,200° C. was 11.5 mass % were mixed at 1:1, and then the mixture was pulverized with a Bantam Mill manufactured by Hosokawa Micron Corporation. The pulverized product was subjected to air classification with a Turbo Classifier manufactured by NISSHIN ENGINEERING INC. to provide an organic carbon raw material having a D50 of 15.5 µm. Next, the pulverized organic carbon raw material was treated at 1,300° C. with a Roller Hearth Kiln manufactured by NGK INSULATORS, LTD. while a nitrogen gas was flowed, whereby carbon material 1 was obtained. Carbon material 1 had a compact powder resistivity of 0.20 Ω·cm when compressed to a density of 1.4 g/cm$^3$, and had an angle of repose of 42°.

Carbon material 1 was graphitized by the same method as that of Example 1. Table 1 summarizes the various physical properties and battery evaluation results of the resultant graphite material (carbon material 2) together with the physical properties of the organic carbon raw material and carbon material 1. As compared with Example 1, the d002 was small and the capacity was high, but the initial efficiency was somewhat low.

Example 3

A graphite material (carbon material 2) was obtained by the same operations as those of Example 1 except that 1,000 ppm by mass of $B_4C$ were added at the time of the graphitization. Table 1 summarizes the various physical properties and battery evaluation results of the resultant graphite material (carbon material 2) together with the physical properties of the organic carbon raw material and carbon material 1. As compared with Example 1, the d002 was small and the capacity was high as a result of the addition of a graphitization co-catalyst, but the initial efficiency was somewhat low.

Comparative Example 1

Carbon material 1 obtained by the same method as that of Example 1 was filled into a lidded graphite crucible and then subjected to a graphitizing treatment in an Acheson furnace at 3,000° C. Table 1 summarizes the various physical properties and battery evaluation results of the resultant graphite material (carbon material 2) together with the physical properties of the organic carbon raw material and carbon material 1.

Substantially the same physical properties as those of Example 1 were obtained. However, the initial efficiency was somewhat low probably because the oxygen amount was somewhat small. In addition, the remaining iron amount was large.

Comparative Example 2

The same petroleum-based raw coke (non-needle coke) as that of Example 1 was pulverized with a Bantam Mill manufactured by Hosokawa Micron Corporation. The pulverized product was subjected to air classification with a Turbo Classifier manufactured by NISSHIN ENGINEERING INC. to provide an organic carbon raw material having a D50 of 16.0 µm. Next, the pulverized organic carbon raw material was treated at 700° C. with a Roller Hearth Kiln manufactured by NGK INSULATORS, LTD. while a nitrogen gas was flowed, whereby carbon material 1 was obtained. Carbon material 1 had a compact powder resistivity of 0.60 Ω·cm when compressed to a density of 1.4 g/cm$^3$, and had an angle of repose of 34°.

Carbon material 1 was graphitized by the same method as that of Example 1. Table 1 summarizes the various physical properties and battery evaluation results of the resultant graphite material (carbon material 2) together with the physical properties of the organic carbon raw material and carbon material 1. As compared with Example 1, the specific surface area was high, the d002 was large, and the capacity was low. Thus, it is understood that the graphitization did not proceed sufficiently.

TABLE 1

|  | Example 1 | Example 2 | Example 3 | Comparative Example 1 | Comparative Example 2 |
|---|---|---|---|---|---|
| Organic carbon raw material | Petroleum-based coke | Petroleum-based coke | Petroleum-based coke | Petroleum-based coke | Petroleum-based coke |
|  | Non-needle | Non-needle + needle | Non-needle | Non-needle | Non-needle |
| Heating loss in range of 300° C. to 1,200° C. (mass %) | 12.5 | Non-needle 12.5 Needle 11.5 | 12.5 | 12.5 | 12.5 |
| CTE ($10^{-6}$° C.) | 4.4 | 4.2 | 4.4 | 4.3 | 4.4 |
| D50 after pulverization (μm) | 16 | 15.5 | 16 | 16 | 16 |
| *Carbon material 1 before graphitization* |  |  |  |  |  |
| Heat treatment temperature (° C.) | 1,000 | 1,000 | 1,000 | 1,000 | 700 |
| Resistivity at 1.4 g/cm$^3$ (Ω·cm) | 0.30 | 0.20 | 0.20 | 0.30 | 0.60 |
| D90 (μm) | 52 | 69 | 52 | 52 | 54 |
| Compressibility (%) | 23 | 25 | 31 | 22 | 18 |
| Sulfur amount (mass %) | 1.2 | 0.8 | 1.2 | 1.2 | 1.2 |
| Angle of repose (°) | 36 | 42 | 34 | 36 | 34 |
| *Carbon material 2 after graphitization* |  |  |  |  |  |
| Graphitization method | Direct | Direct | Direct | Graphite crucible | Direct |
| Graphitization co-catalyst | — | — | B$_4$C | — | — |
| d002 (nm) | 0.3365 | 0.3362 | 0.3363 | 0.3365 | 0.3368 |
| D50 (μm) | 15.1 | 14.8 | 15.0 | 15.8 | 15.3 |
| Specific surface area (m$^2$/g) | 1.8 | 2.2 | 2.3 | 1.3 | 2.1 |
| Aspect ratio | 1.5 | 1.7 | 1.3 | 1.4 | 1.5 |
| R value | 0.15 | 0.13 | 0.17 | 0.05 | 0.06 |
| Compact resistivity ratio* | 0.07 | 0.1 | 0.1 | 0.07 | 0.03 |
| Tap density (g/cm$^3$) | 1.23 | 1.20 | 1.22 | 1.29 | 1.21 |
| Oxygen content (ppm by mass) | 200 | 220 | 180 | 60 | 140 |
| Remaining iron amount (ppm by mass) | 10 | 8 | 10 | 50 | 15 |
| *Battery characteristic* |  |  |  |  |  |
| Discharge capacity (mAh/g) | 330 | 345 | 345 | 330 | 320 |
| Initial efficiency (%) | 94 | 91 | 92 | 90 | 90 |

*Compact resistivity ratio = (compact powder resistivity when carbon material 2 after the graphitization is compressed to a density of 1.4 g/cm$^3$)/(compact powder resistivity when the carbon material 1 before the graphitization is compressed to a density of 1.4 g/cm$^3$)

The invention claimed is:

1. A method of producing a graphite material for an electrode material for a lithium ion battery, the method including a graphitizing step of directly passing an electric current through a carbon material from an electrode in direct contact with the carbon material to cause the material to generate heat, in which carbon material 1 before the graphitization has a compact powder resistivity of 0.4 Ω·cm or less when compressed to a density of 1.4 g/cm$^3$, has an angle of repose of 20° or more and 50° or less, and has a particle size D90 of 120 μm or less in a volume-based particle size distribution measured by a laser diffraction method, and carbon material 2 after the graphitization has an average interplanar spacing d002 of a (002) plane measured by an X-ray diffraction method of 0.3354 nm or more and 0.3450 nm or less, in which a rectangular parallelepiped furnace body made of ceramic bricks and having an opening in an upper portion thereof is used in the graphitizing step, wherein the carbon material 1 before the graphitization is obtained by subjecting an organic carbon raw material to a heat treatment, and wherein a pulverization for the organic carbon raw material is performed before the heat treatment.

2. The method of producing a graphite material according to claim 1, in which a ratio (compact powder resistivity when carbon material 2 after the graphitization is compressed to a density of 1.4 g/cm$^3$)/(compact powder resistivity when carbon material 1 before the graphitization is compressed to a density of 1.4 g/cm$^3$) is equal to or less than 0.5.

3. The method of producing a graphite material according to claim 1, in which carbon material 1 before the graphitization has an average particle size D50 of 30 μm or less in the volume-based particle size distribution measured by the laser diffraction method.

4. The method of producing a graphite material according to claim 1, in which carbon material 1 before the graphitization has an angle of repose of 30° or more and 50° or less, and has a compressibility ((compacted bulk density−loose bulk density)×100/loose bulk density) calculated from a loose bulk density and a compacted bulk density of 20% or more and 50% or less.

5. The method of producing a graphite material according to claim 1, wherein the heat treatment is performed at 800° C. or more and 1,500° C. or less.

6. The method of producing a graphite material according to claim 5, in which when the organic carbon raw material is heated under an inert atmosphere from 300° C. to 1,200° C., a heating loss thereof in the temperature region is 5 mass % or more and 20 mass % or less.

7. The method of producing a graphite material according to claim 5, in which a sulfur content in the organic carbon raw material is 2 mass % or less.

8. The method of producing a graphite material according to claim 5, in which the organic carbon raw material is one or more kinds selected from a petroleum pitch, a coal-tar pitch, a coke, a petroleum coke, and a mixture thereof.

9. The method of producing a graphite material according to claim 1, in which carbon material 1 before the graphitization contains 10 to 100,000 ppm by mass of a boron-based compound and/or a silicon-based compound.

10. The method of producing a graphite material according to claim 1, in which a length in a longitudinal direction of the furnace body viewed from an opening portion direction is twice or more as long as a length in a lateral direction thereof.

11. The method of producing graphite material according to claim 1, in which electrodes for applying current are placed on inner sides of both end surfaces in the longitudinal direction of the furnace body.

12. The method of producing a graphite material according to claim 1, in which a surface in contact with air is provided with an oxygen barrier layer.

\* \* \* \* \*